United States Patent

Pommier

[15] 3,694,889
[45] Oct. 3, 1972

[54] METHOD OF SETTING FIRE RINGS IN CYLINDER HEAD GASKETS

[72] Inventor: Pierre Pommier, Saint-Priest, France

[73] Assignee: Societe Anonyme dite: CEFILAC, Paris, France

[22] Filed: Oct. 5, 1970

[21] Appl. No.: 77,841

[30] Foreign Application Priority Data

Oct. 10, 1969  France..................6934752

[52] U.S. Cl. ..................29/412, 29/421, 29/512, 277/235 B
[51] Int. Cl. ..............................B23p 17/00
[58] Field of Search...............29/412, 421, 512, 523; 277/235 B

[56] References Cited

UNITED STATES PATENTS

| | | | |
|---|---|---|---|
| 2,134,868 | 11/1938 | Fitzgerald | 277/235 B |
| 2,167,475 | 7/1939 | Dickson | 29/512 |
| 2,829,488 | 4/1958 | Valli | 29/512 UX |
| 3,150,790 | 9/1964 | Beneteau | 29/512 UX |
| 3,361,251 | 1/1968 | Olsson | 29/512 X |
| 3,549,157 | 12/1970 | Bennigsen | 277/235 B X |
| 3,586,338 | 6/1971 | Miklau | 277/235 B X |

FOREIGN PATENTS OR APPLICATIONS 499,722   1/1939   Great Britain .........277/235 B Primary Examiner—Charlie T. Moon
Attorney—Holcombe, Wetherill & Brisebois

[57] ABSTRACT

Method of setting fire rings in gaskets according to which a metallic sheet is provided with holes having upstanding cylindrical rings dimensioned and positioned to register with holes in the gasket. Rings encircling these rims are then cut from the metallic sheet while retaining them in their relative position, the gasket is placed on the rings so that the rims project through the gasket holes, and the rims are pressed down against the gasket. The invention includes a machine which carries out all but the first of these steps successively and automatically.

2 Claims, 6 Drawing Figures

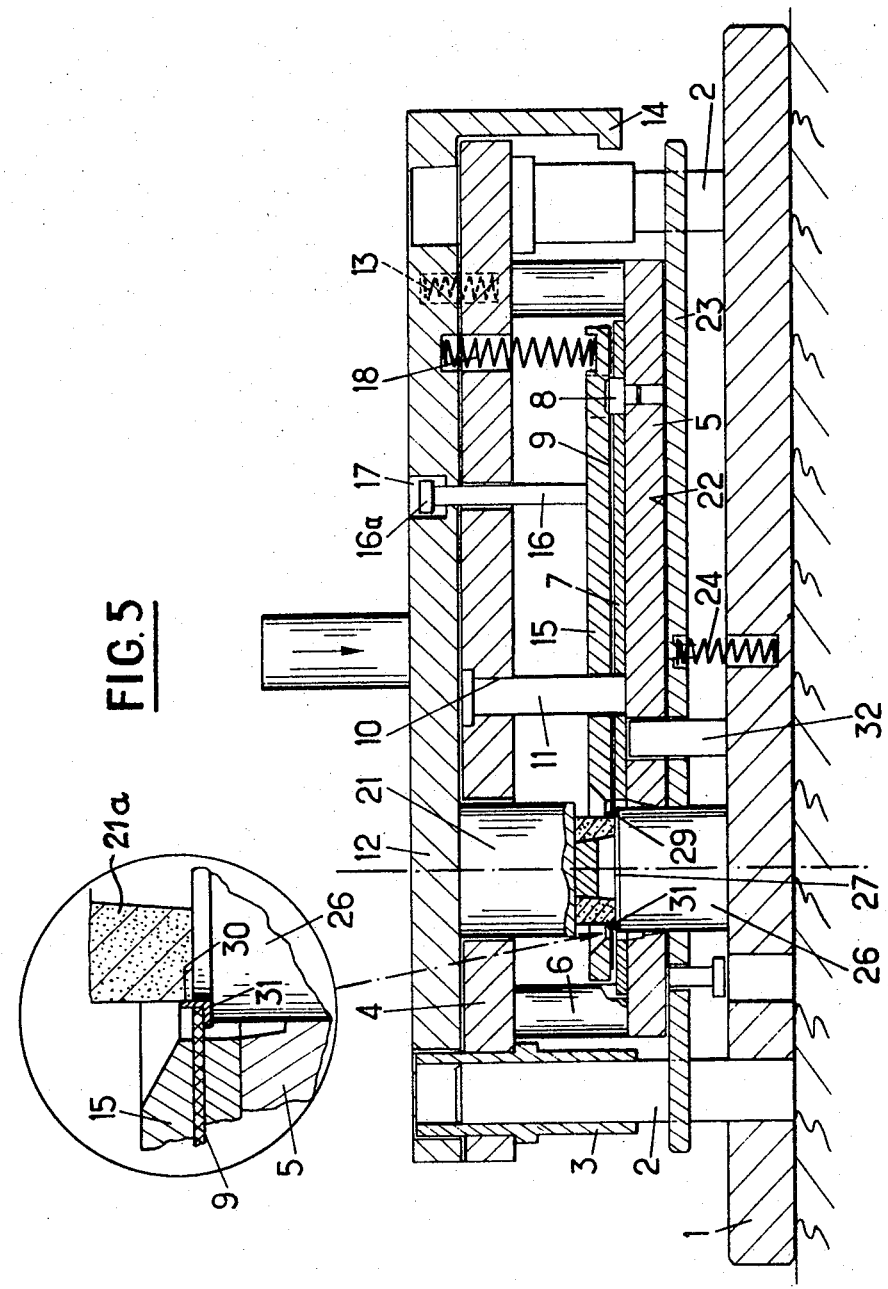

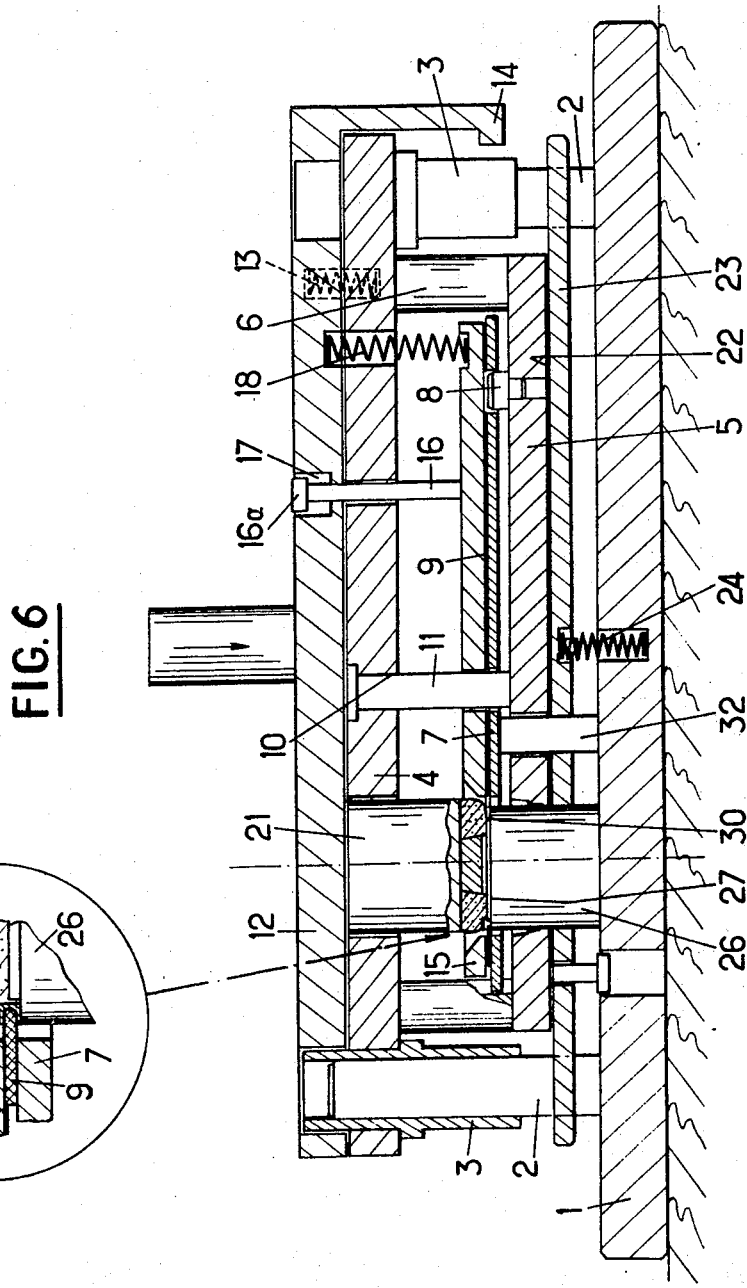

METHOD OF SETTING FIRE RINGS IN CYLINDER HEAD GASKETS

SUMMARY OF THE INVENTION

It is conventional to provide the holes in gaskets of the type used in motors, and in particular cylinder head gaskets, with linings in the form of metallic rings, called fire rings.

Heretofore, these metallic rings have been mounted in the gasket by means of a tool which, in the course of its descent, applied the cylindrical upper part of the ring to the upper surface of the gasket. The lower part of the ring comprised a flange cut from the original metallic sheet and was applied to the lower face of the gasket.

This technique necessitated the successive supplying of the tool with rings, as well as repositioning at each descent of the die. Moreover, this positioning leads to errors because the different rings applied to a single gasket could be intentionally geometrically different, but these differences were in some cases, hard to detect with the naked eye. This resulted in a slow rate of manufacture and a relatively high cost.

The present invention is intended to provide a method of setting metallic rings in the corresponding orifices of a cylinder head gasket which makes the steps of positioning and attaching the various rings easier by combining these two steps into a single step.

It is the object of the invention to provide a method of setting metallic fire rings in the corresponding orifices of a cylinder head gasket which is characterized by the step of providing a flat metallic sheet having orifices therein encircled by cylindrical bent-up edges, the dimensions of which correspond to the dimensions of the orifices in the cylinder head gasket and the relative positions of which correspond to the relative positions of the orifices in this gasket. This sheet is positioned on a support, and the rings are cut from this sheet while leaving around each cylindrical portion a flange in the plane of the sheet, without modifying the initial position of the rings on the support. The cylinder head gasket is placed on this sheet so that the cylindrical parts thereof pass through corresponding orifices in the gasket and one of the surfaces thereof comes in contact with the flange. The cylindrical parts are then bent back against the surface of the cylinder head gasket on the opposite side thereof from the surface in contact with the flange.

In one particular method of carrying out the invention the orifices having bent-up edges are formed in the sheet before it is positioned on the support.

It is also an object of the invention to provide a device for carrying out the process characterized by the fact that it comprises a support having at least one cutting punch, on which the sheet rests at the level of the corresponding orifices in the gasket, and a mobile assembly above this support comprising a cutting die the upper face of which carries the cylinder head gasket through an independent plate. This mobile member also comprises at least one deformable punch for setting the rings in the gasket.

According to one particular characteristic of this device, the mobile member comprises, slidably mounted on a fixed frame, a die-carrying plate carrying therebeneath at a certain distance, the cutting die, a plate carrying setting punches positioned above the die-carrying plate and adapted to slide in the same direction with respect to the die-carrying plate against the resistance of a spring which normally maintains the two plates spaced from each other until forcibly brought together. A pressure plate is positioned beneath the die-carrying plate and this pressure plate is capable of sliding in the same direction with respect to the die-carrying plate and the plate which carries the setting punches. This pressure plate is normally spaced from the plate carrying the setting punches by a spring passing through the die-carrying plate so that when downward pressure is applied to the plate carrying the setting punches the consequent downward movement brings the pressure plate against the upper surface of the cylinder head gasket mounted on top of the cutting die, after which only the plate carrying the setting pins continues to move with respect to the die-carrying plate until it comes in contact therewith to drive it and the die in the direction of the metallic sheet positioned on its support.

According to another characteristic of this device, the support holding the metallic sheet may consist of a plate capable of sliding with respect to the fixed framework and normally held in its upper position by a compression spring bearing on the lower part of the fixed framework. This plate acts as a lower pressure plate and is provided with perforations which permit the passage of cutting punches fixed to the framework. This plate sinks downwardly against the resistance of its spring when the lower face of the cutting die strikes the metallic sheet. This has the effect of cutting out the rings which are retained by the cutting punches during the descent of the sheet gripped between the die and the lower plate. The plate is resiliently returned upwardly during the retraction of the die.

The invention also relates to cylinder head gaskets provided with rings according to the process described above.

The invention will be better understood from a study of the following description, given purely by way of example, with reference to the accompanying drawings on which:

FIGS. 2 to 6 represent vertical sectional views taken along the line II—II of FIG. 1, showing it in successive stages of operation.

Figure 1:
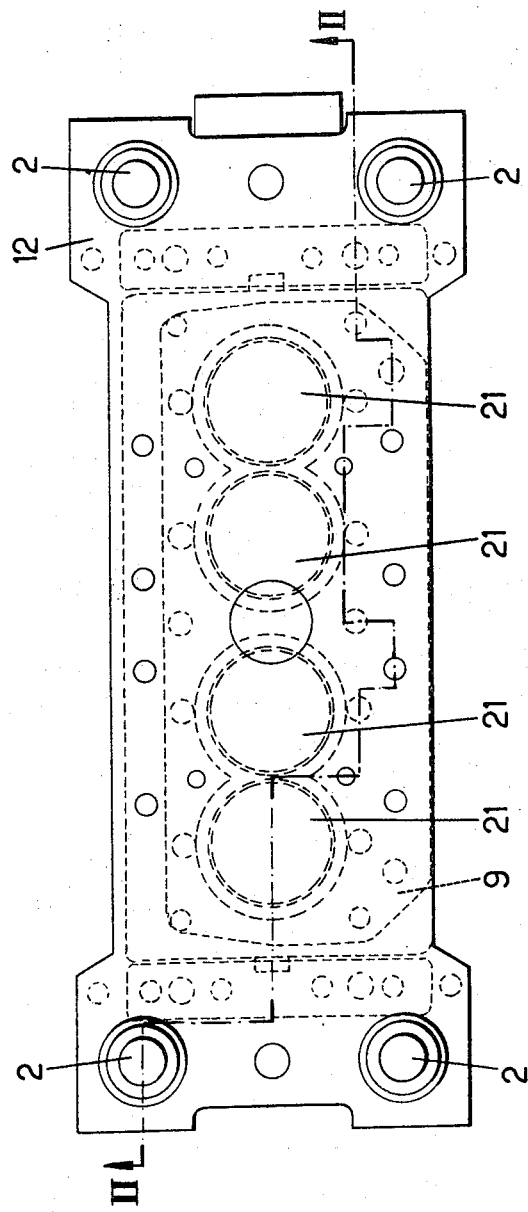
FIG. 1 is a top plan view of the device according to the invention.

Several of these figures are accompanied by schematic enlargments of the parts immediately adjacent the rings.

The process according to the invention is carried out by using a device comprising a fixed frame 1 carrying a certain number of vertical columns 2 on which the guides 3 fixed to a die-carrying plate 4 are slidable. This plate is attached to a cutting die fastened therebeneath by means of posts 6. The upper surface of the cutting die 5 carries a holding plate 7 through which pass the centering pins 8 for exactly positioning the cylinder head gasket 9 by means of corresponding holes therein.

As the plate 7 moves with respect to the die 5 it is guided by tenons sliding in grooves in the posts 6.

Figure 2:
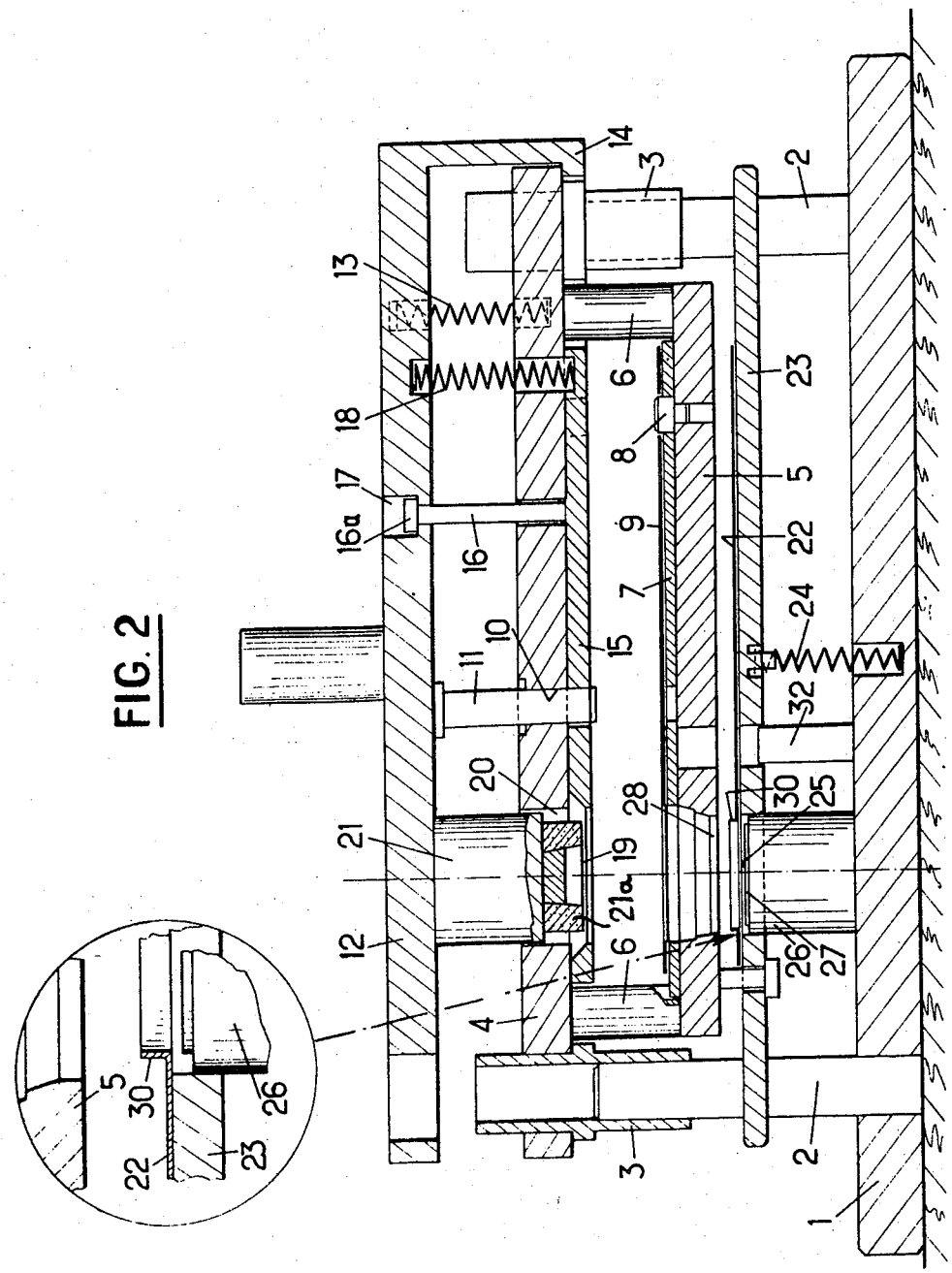

The die-carrying plate 4 is provided with a certain number of orifices 10 adapted to guide columns 11 fixed to a plate 12 which carries the setting punches. This plate is normally spaced from the plate 4 by a compression spring 13 as shown in FIG. 2 which illustrates the rest position of the apparatus. A stop 14 which engages the lower surface of the die-carrying plate 4 defines the position of maximum separation of the two plates.

A pressure plate 15 is attached to a certain number of columns 16 which pass freely through the die-carrying plate 4 to slide in orifices 17 in the plate 12 in which they are guided. A compression spring 18 passing freely through the die-carrying plate 4 biasses the pressure plate 15 away from the plate 12 carrying the punches. A catch 16a at the upper end of the column 16 then engages the bottom of the orifice 17 to prevent the pressure plate 15 from falling. The pressure plate 15 and the die-carrying plate 4 are provided with a certain number of orifices 19 and 20 respectively, through which pass a corresponding number of deformable setting punches 21, which are positioned in the same configuration as the orifices in the cylinder head gasket which are to receive the fire rings.

Figure 3:
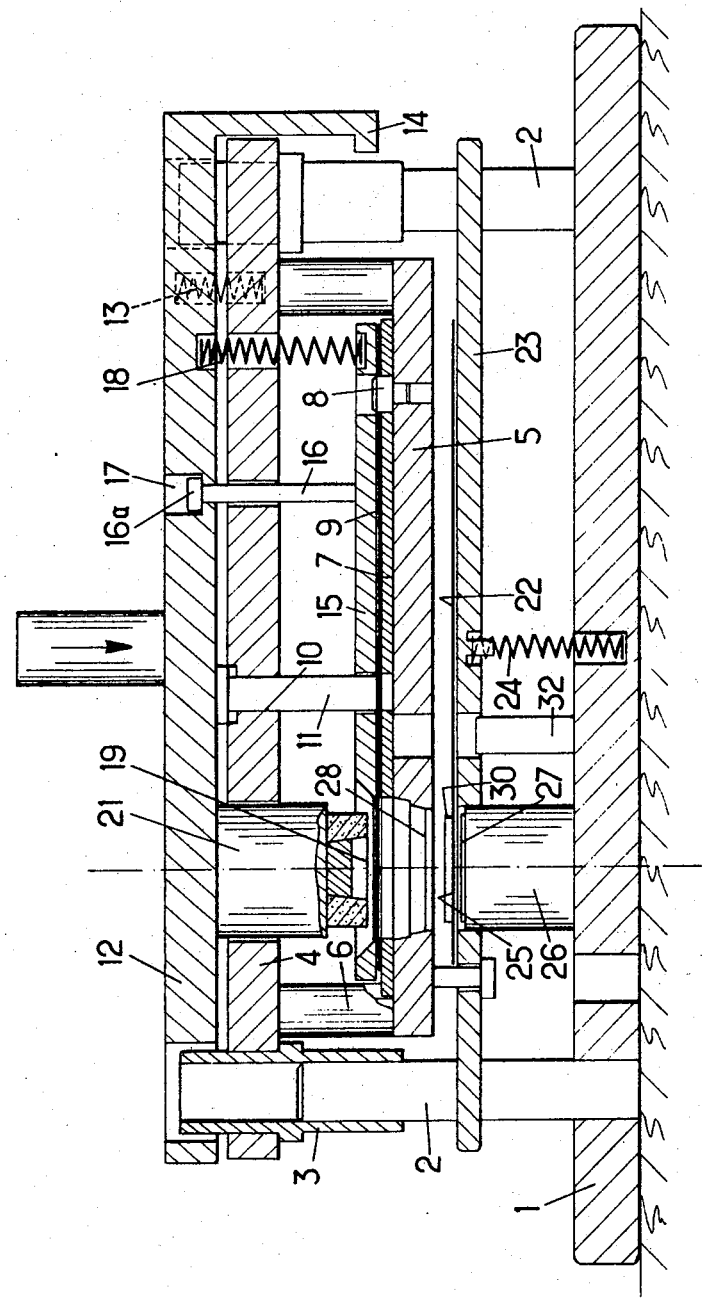

By applying a downward force in the direction of the arrow F to the plate 12 carrying the setting punches, this plate is moved downwardly without at first carrying with it the die-carrying plate 4. As it descends, the plate 12 drives the pressure plate 15 downward, acting through the spring 18, until the pressure plate strikes the upper surface of the cylinder head gasket 9 which is then firmly gripped. Continuing its downward movement, the plate 12 strikes the die-carrying plate 4 which is in turn driven downwardly. This position is shown in FIG. 3.

The metallic sheet 22 is positioned on a plate 23 which is slidable along the cutting punches 26 against the resistance of a spring 24 which tends to bias it upwardly. The plate 23 is, on the other hand, provided with a certain number of orifices 25, each of which is centered on the axis of one of the setting punches 21. These orifices 25 admit a certain number of cutting punches 26, each of which carries a centering stud 27 on its upper end. In alignment with each cutting punch 26, attached to the frame 1, is an orifice 28, the shape of which is identical to that of the orifice 25 in the corresponding plate 23, and located in the cutting die 5 so as to cooperate during the descent of this die with the punch 26 to cut the ring 29 from the sheet 22.

The device operates as follows:

With the device in the starting position represented on FIG. 2, the gasket 9 is positioned on the holding plate 7 and the sheet 22, already provided with cylindrical orifices having upwardly bent edges 30, is positioned on the plate 23 which serves as a support. When force is exerted in the direction of the arrow F, the pressure plate 15 is urged against the gasket 9 so as to hold it in place.

After this a plate 12 carrying the setting punches strikes the die-carrying plate 4 as shown in FIG. 3 and drives it downwardly.

Figure 4:
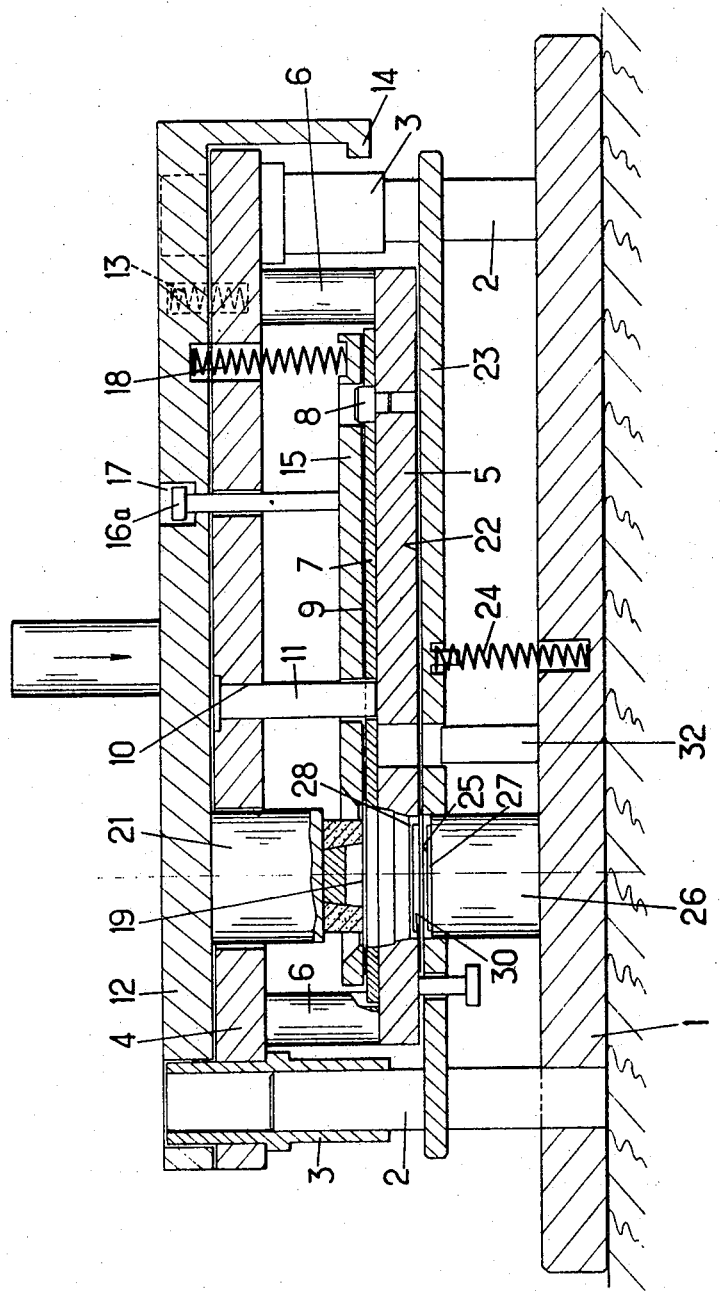

In the course of this movement the die 5, driven by the posts 6 and the columns 11, strikes the upper surface of the metallic sheet 22 which, being gripped on the other side by the lower plate 23, as shown in FIG. 4, starts to descend against the resistance of the spring 24 as shown in FIG. 5. This cuts the ring 29 from the sheet. The downward movement continues with the gasket 9 coming into a position in which each of its orifices is traversed by the cylindrical edge 30 of the corresponding ring 29, with the lower face of the gasket resting on the flange 31 of each ring. At this moment the active part 21a of the punch 21, which is made of rubber, enters the ring 29 and encounters the centering plate 27 which serves to hold the ring 29 after it has been cut out.

In this position, shown in FIG. 5, the holding plate 7 is in engagement with a stop 32, and the gasket 9 as well as the upper pressure plate 15 are immobilized.

The downward movement continues so that the punch 21 is compressed against the plate 25. This bends the flange 30 over the gasket 9 all the way around the periphery of the orifice in this gasket. At this moment the pressure is stopped and the device is returned to its initial position by the various springs. It then suffices to remove what is left of the sheet 22 and the gasket 9 equipped with its fire rings.

It will of course be appreciated that the device which has been hereinbefore described may be modified as to detail without thereby departing from the basic principles of the invention as defined by the following claims. For example a separate force could be applied to each of the mobile members during its operation.

What is claimed is:

1. Method of setting fire rings in the orifices of a gasket which method comprises the steps of preparing a flat metallic sheet having orifices encircled by upturned cylindrical rims dimensioned to fit into and having relative positions corresponding to those of the orifices in said gasket, positioning said sheet on a support, cutting rings from said sheet encircling said rims while leaving around each cylindrical rim a flange in the plane of the sheet and without modifying the position of the rings, depositing said gasket on said rings so that said cylindrical rims pass through the corresponding orifices in the gasket and one of the surfaces of the gasket comes into contact with the flanges, and bending the cylindrical rims back against the surface of the gasket opposite the surface in contact with the flanges.

2. Method as claimed in claim 1 in which the orifices in the metallic sheet are formed before it is positioned on the support.

* * * * *